Patented Feb. 22, 1949

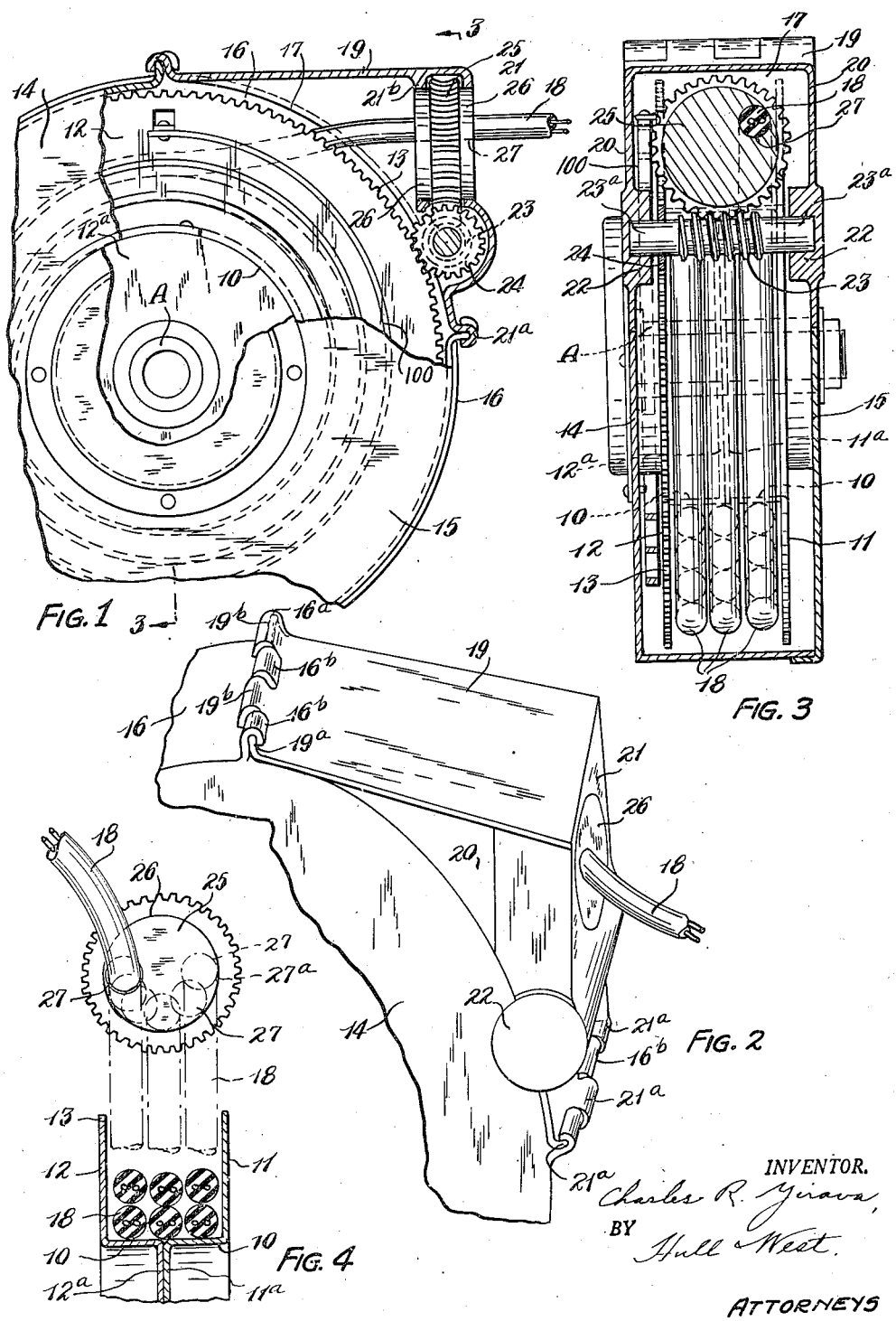

2,462,296

UNITED STATES PATENT OFFICE 2,462,296

SPRING REEL

Charles R. Yirava, Cleveland, Ohio, assignor to Benjamin Reel Products, Inc., Cleveland, Ohio, a corporation of Ohio Application March 6, 1947, Serial No. 732,703

10 Claims. (Cl. 242—107)

This invention relates to reels, and more particularly to reels of the type whereon flexible members, such as electric cords or wires are wound and from which such members may be unwound and, where the members are electric cords, will enable the plug-in connectors of the latter to be secured to the appropriate receptacles for operating various electrical appliances.

The general purpose and object of the invention is to provide a reel of the foregoing type with automatically operated means for insuring the winding of the flexible member in concentric helical courses around the drum and wherein the convolutions of the cord in each said helical course shall be accurately positioned with respect to one another; also to provide a reel of the foregoing character with automatically operating means whereby the direction of winding of successive helical courses will be automatically reversed, without interruption of the winding operation.

I accomplish the foregoing objects in and through the construction and arrangement of parts shown in the drawings hereof, wherein Fig. 1 represents an end elevational view, with parts broken away, of a portion of a reel equipped with our invention and comprising the winding attachment and the portion of the reel which cooperates therewith; Fig. 2 a detail in perspective elevation of the portion of the reel to which the aforesaid attachment is secured and also showing in perspective the housing for said attachment; Fig. 3 is a detail in section taken on the line 3—3 of Fig. 1 and looking in the direction of the arrows; Fig. 4 is a diagrammatic detail, in sectional elevation, of the hub or drum portion and the retaining members of the reel and of the worm gear distributor and illustrating the manner in which the said distributor operates to effect the winding of a cord in the manner described.

Describing the various parts shown in the drawing by reference characters, 10 denotes the inner drum of a reel to the front and rear ends of which are attached retaining members 11 and 12, respectively, extending radially therefrom and of which retaining members, the member 12 is provided with gear teeth 13 projecting from the circular periphery thereof. The drum and the retaining members 11 and 12 may be made of two sections which are symmetrical, except that the retaining member 12 has the teeth 13 on the periphery thereof; and these symmetrical sections may be united by annular webs 11ª and 12ª extending across the interior of the drum and united by any suitable means, as by welding.

The shaft A extends through the central opening provided therefor in the said webs and on which shaft the drum, with its retaining members, is supported for rotation. 14 denotes the front wall and 15 the rear wall of a housing for the reel, the said walls being united by a cylindrical outer wall 16. The cylindrical wall 16 is provided with an opening 17 for the reception of a flexible member 18, such as a cord-wire, and which is wound about the drum.

19 denotes the top or cover, 20 the side walls and 21 the front wall of a housing which is secured to the cylindrical housing member 16 in any approved manner, as by means of alternating flanges 16ª and hooks 16ᵇ on the housing member cooperating with alternating flanges 19ª and hooks 19ᵇ on the top or cover 19, the hooks carried by the housing member 16 and the top or cover 19 engaging the flanges carried by the other of said members, respectively. The bottom of the front wall 21 of the housing is shown as secured in like manner by hooks 21ª to flanges projecting from the wall 16 and the latter wall is secured to flanges on the bottom of the wall 21 by means of hooks 16ᵇ—the construction being preferably the same as that employed for securing the top or cover 19 of the housing to the wall 16.

22 denotes bearings mounted in the side walls 20 of the housing and in which bearings are journaled the ends 23ª of a worm shaft, the worm whereof is indicated at 23. 24 denotes a gear which is secured to the shaft 23ª and which meshes with the gear teeth 13 on the retaining member 12. 25 denotes a disk member, in the shape of a worm gear, which is driven from the gear teeth 13 through the gears 23 and 24. The worm is provided with enlarged hubs 26 mounted in bearings provided therefor in the wall 21 and in a wall 21ᵇ, parallel with the wall 21. The worm is supported with its axis of rotation at substantially right angles to the axis of rotation of the drum and with said axis of rotation located midway of the length of the drum; and it is of somewhat greater diameter than the length of the drum and is provided with an opening 27, for the reception of the flexible member 18, between the center and the periphery thereof and which is so located that the distance of the radially outer wall of the opening when at its greatest distance from the center of rotation or axis of the worm is substantially equal to half the axial length of the drum. As the worm rotates, the radially outer wall of the opening will be brought alternately adjacent to the retaining members 11 and 12.

The worm and its hubs are provided with a guide opening 27 extending therethrough and through which the flexible member 18 extends. The extreme inner end of this member is connected to the drum 10, adjacent to one of the retaining walls 11, 12, in the usual manner. The reel is provided with the usual winding spring 100 of the clock-spring type, such as shown in the application of James E. Johnson and myself, Serial No. 739,102 filed April 3, 1947 and its inclusion in the drawing hereof is unnecessary to an understanding of my invention.

The gear-reduction ratio between the gear on the retaining member 12 and the worm 25 depends upon the number of turns or convolutions of the flexible member required to constitute one helical course about the drum. In the drawing the length (and capacity) of the drum with reference to the flexible member is such that it will accommodate only three turns of the flexible member 18 in each helical course. With such capacity, the gear reduction drive between the gear 13 and the worm wheel 25 is such that the latter makes one complete rotation for every six rotations of the former. As will be seen by reference to Figs. 3 and 4, and assuming that the winding spring rotates the drum in a counter-clockwise direction, the worm will be so positioned that, at the start of the winding operation, the opening 27 will be at one side of and adjacent to the bottom of the worm. In this position, the flexible member 18 will be directed at the junction of the wall 10 of the drum and the appropriate retaining member—shown as member 12 in Fig. 4. As the worm continues to rotate, the opening is moved and directs the next turn of the member 18 in contact with the first turn, and further rotation directs the third turn in contact with the second turn, the opening 27 having been moved meanwhile from the full-line position shown on Fig. 4 to the diametrically opposite position 27ª. Further rotation of the worm causes the opening to be moved upwardly from the position 27ª laying the first turn of the next helical course immediately above the last turn of the preceding helical course. Further movement of the worm 25 will lay the second and third turns of the second outer course against the corresponding turns of the first or inner course. This automatic reversal of the winding at the end of each course will continue until the flexible member 18 is entirely wound upon the drum.

Obviously the ratio between the gear 13 and the worm 25 will be decreased with the number of turns of the flexible member in each helical course; thus, with a four-high number of turns in each course, the gear reduction will be such as to effect one rotation of the worm wheel for every eight rotations of the drum, it being noted that the number of turns required for the drum to effect a complete rotation of the worm wheel will be an even number of rotations, or a multiple of two.

For convenience of description the reel has been assumed to occupy a position wherein the support A therefor is in a horizontal position and the terms "front" and "rear" have been applied to the parts of the reel and its housing in the description and claims hereof but without any intention thereby of limiting the reel to any position which it may occupy when in use.

Having thus described my invention, what I claim is:

1. A reel assembly comprising a drum upon which a flexible connector is wound, means for rotating the said drum, and means for controlling the winding of a flexible connector in a series of helical courses each extending around, and lengthwise of, said drum and for automatically reversing the direction of winding of successive helical courses of said connector around and lengthwise of said drum, the said second means comprising a member secured to and extending radially outwardly from an end portion of said drum and provided with a gear driving element extending therearound concentric with the center of rotation of said drum, a disk having an opening therethrough for the passage of said flexible connector, said opening being located between the center and the periphery of said disk, means rotatably supporting the disk with its axis of rotation at substantially right angles to the axis of rotation of said drum and midway of the length of the drum, and a gear-reduction drive between the said gear driving element and the said disk, whereby a complete rotation will be imparted to the disk by an even number of rotations of the drum.

2. A reel assembly comprising a drum upon which a flexible connector is wound, means for rotating the said drum, and means for controlling the winding of a flexible connector in a series of helical courses each extending around, and lengthwise of, said drum and for automatically reversing the direction of winding of successive helical courses of said connector around, and lengthwise of, said drum, the said second means comprising a member secured to and extending radially outwardly from an end portion of said drum and provided with a gear driving element extending therearound concentric with the center of rotation of said drum, a disk having an opening therethrough for the passage of said flexible connector and located between the center and periphery of said disk, means rotatably supporting said disk with its axis of rotation at substantially right angles to the axis of rotation of said drum and midway of the length of the drum, the distance of the outer wall of the opening in said disk from the center of rotation of the latter being substantially equal to half the length of the drum, and a gear reduction drive between the said gear driving element and the said disk whereby a complete rotation will be imparted to the disk by an even number of rotations of the drum.

3. A reel assembly comprising a drum, retaining members connected thereto and providing with the drum a space for the reception of a flexible connector wound upon the drum, one of said members having a circular gear-driving element connected thereto and concentric with the center of rotation of said drum, a gear member adapted to be driven by said gear-driving element, a disk and means rotatably supporting the same, a driving connection between said disk and said gear member, the disk being provided with an opening between the center and the periphery thereof through which the flexible connector, which is wound upon the drum, extends and which approximately sizes said opening, and means for supporting the said gear member and the disk with the gear member in driving engagement with the said gear-driving element and with the plane of the disk at substantially right angles to the axis of rotation of the drum and with the axis of rotation of said disk located substantially midway between the planes of said retaining members, the distance of the outer wall of the opening from the center of rotation of said disk being substantially equal to half the distance between the said retaining members, and the gear driving element and the gear member imparting a complete rotation to said disk for an even number of rotations of said drum.

4. In the reel assembly set forth in claim 2, the disk being circular and provided with teeth extending around the periphery thereof, and the gear reduction drive between the gear-driving element comprising a pinion meshing with the gear-driving element, a shaft driven by said pinion, and a gear member on said shaft engaging the gear teeth on the disk.

5. In the reel assembly set forth in claim 4, the gear teeth on the disk being worm gear teeth and the gear member on the shaft being a worm.

6. A reel assembly comprising a drum upon which a flexible connector is wound, said drum having a radially outward portion provided with a gear driving element concentric with the center of rotation of said drum, a disk having an opening therethrough for the relatively snug passage of a flexible connector, said opening being located between the center and the periphery of said disk, means rotatably supporting the disk with its axis of rotation at substantially right angles to the axis of rotation of said drum, and a gear reduction drive connected between the said gear driving element and the said disk whereby rotation will be imparted to the disk by rotation of the drum to distribute convolutions of the flexible connector over at least a portion of the width of said drum.

7. A reel assembly comprising a drum upon which a flexible connector is wound, a frame in which said drum is journalled, a gear driving element concentric with the center of rotation of said drum movable with said drum, a disk having an opening therethrough for the passage of a flexible connector journalled in said frame adjacent the periphery of said disk, said opening being located between the center and the periphery of said disk at a distance from the center of the disk substantially equal to one half the width of said drum, said disk being positioned with its axis of rotation at substantially right angles to the axis of rotation of said drum but with the disk's axis of rotation being in the medial plane of said drum, and a gear-reduction drive connected between the said gear driving element and the said disk, whereby rotation will be imparted to the disk by rotation of the drum to distribute convolutions of the flexible connector over the axial width of said drum.

8. A level winding device comprising a drum, a frame, means journaling said drum on said frame for rotation in a fixed plane, a gear device formed in with the periphery of one portion of said drum, a gear reduction unit journaled in said frame and driven by said gear device, and a disk member journalled in said frame and positioned flush with one external surface of such frame, said disk member having a gear formed integrally therewith and connected to said gear reduction device for rotation of the disk member in said frame, said disk member having a hole formed therein adjacent its periphery for snug receipt of a flexible conductor member which is wound onto said drum for storage thereon, said disk member being substantially positioned in a plane at right angles to the medial plane of said drum, and being substantially as wide in diameter as said drum is in width, said disk member being positioned adjacent said drum by said frame external but adjacent the periphery of said drum, with the longitudinal axis of the disk member being in the medial plane of said drum whereby rotation of said disk member is occasioned by rotation of the drum and with the disc member controlling the positioning of the conductor on the drum as it is deposited thereon.

9. A level winding device comprising a drum, a frame, means journalling said drum in said frame for rotation in a fixed plane, a gear movable with said drum, a disk journalled in said frame substantially normal to the medial plane of said drum, and a gear movable with said disk and coupled to said first gear for rotation therewith for driving said disk, said disk having a hole formed therein adjacent its periphery for receipt of a flexible conductor member which is to be wound onto said drum for storage thereon.

10. A reel assembly as in claim 7 wherein said disc has enlarged hubs formed at the periphery thereof and engaged with bearings formed in said frame, said disc being a worm gear and being engaged with a worm forming part of said gear reduction drive, said disc being retained in said frame by engagement of said worm and worm gear.

CHARLES R. YIRAVA.

REFERENCES CITED

The following references are of record in the file of this patent:

UNITED STATES PATENTS

| Number | Name | Date |
| --- | --- | --- |
| 1,030,770 | Cavileer | June 25, 1912 |
| 1,587,437 | Sturge | June 1, 1926 |
| 1,953,581 | Ballou | Apr. 3, 1934 |